United States Patent
Keller

(10) Patent No.: US 10,087,826 B2
(45) Date of Patent: Oct. 2, 2018

(54) EXHAUST-GAS TURBOCHARGER INCLUDING A CHARGE PRESSURE CONTROL LEVER HAVING BARREL-SHAPED PIN

(71) Applicant: BorgWarner Inc., Auburn Hills, MI (US)

(72) Inventor: Peter Keller, Osthofen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/905,884

(22) PCT Filed: Jul. 15, 2014

(86) PCT No.: PCT/US2014/046657
§ 371 (c)(1),
(2) Date: Jan. 18, 2016

(87) PCT Pub. No.: WO2015/013061
PCT Pub. Date: Jan. 29, 2015

(65) Prior Publication Data
US 2016/0169093 A1    Jun. 16, 2016

(30) Foreign Application Priority Data
Jul. 22, 2013  (DE) .......................... 10 2013 214 270

(51) Int. Cl.
*F02B 37/18* (2006.01)
*F02C 6/12* (2006.01)

(52) U.S. Cl.
CPC .............. *F02B 37/186* (2013.01); *F02C 6/12* (2013.01); *F05D 2220/40* (2013.01); *F05D 2260/606* (2013.01); *Y02T 10/144* (2013.01)

(58) Field of Classification Search
CPC ...... F01D 17/105; F02B 37/18; F02B 37/183; F02B 37/025; F02C 6/12; C04B 41/52;
(Continued)

(56) References Cited

U.S. PATENT DOCUMENTS 3,333,876 A * 8/1967 Chow .................... F16C 11/06
                                                        403/144
4,463,564 A     8/1984 McInerney
(Continued)

FOREIGN PATENT DOCUMENTS

AU    1964050613 B * 10/1964
CN    102052320 A    5/2011
(Continued)

OTHER PUBLICATIONS

International Search Report of PCT/US2014/046657 dated Nov. 14, 2014.
(Continued)

*Primary Examiner* — Mark Laurenzi
*Assistant Examiner* — Paul Thiede
(74) *Attorney, Agent, or Firm* — Eric L. Doyle; Stephan A. Pendorf; Patent Central LLC

(57) ABSTRACT

An exhaust-gas turbocharger with a compressor with a charge pressure control device. An actuator is provided which moves a control rod arrangement. The control rod arrangement is in turn rotatably connected to a lever. The charge pressure control device is actuated by the lever. A pin is arranged on the lever. The control rod arrangement has a bushing which is pushed onto the pin. The connection between pin and bushing constitutes a rotatable connection for enabling the lever to be actuated by the control rod arrangement. This arrangement is very simple to produce and very simple to assemble because the bushing must merely be pushed onto the pin.

5 Claims, 5 Drawing Sheets

(58) Field of Classification Search
CPC ....... C04B 14/202; C04B 14/28; C04B 14/42; C04B 41/48; C04B 41/4803
USPC .................................. 60/602, 772; 137/601.1
See application file for complete search history.

(56) References Cited

U.S. PATENT DOCUMENTS

| | | | |
|---|---|---|---|
| 4,656,834 A | | 4/1987 | Elpern |
| 5,739,501 A * | | 4/1998 | Peterson ............... B23K 37/047 219/117.1 |
| 6,883,317 B2 * | | 4/2005 | Heath .................... F02B 37/186 137/527 |
| 7,644,583 B2 | | 1/2010 | Leavesley |
| 2004/0213665 A1 * | | 10/2004 | Ohishi .................... C22C 38/04 415/151 |
| 2006/0289072 A1 * | | 12/2006 | McMullen ............ F01D 17/105 137/601.01 |
| 2007/0209363 A1 | | 9/2007 | McEwen et al. |
| 2011/0016666 A1 * | | 1/2011 | Wannenmacher ... G02C 5/2245 16/228 |
| 2011/0099999 A1 | | 5/2011 | Natali |
| 2012/0216543 A1 * | | 8/2012 | Eleftheriou ............... F02C 7/08 60/772 |
| 2013/0139502 A1 | | 6/2013 | Chu |

FOREIGN PATENT DOCUMENTS

| | | |
|---|---|---|
| CN | 103133127 A | 6/2013 |
| EP | 0523859 A1 | 1/1993 |
| JP | 5713838 U | 1/1982 |
| JP | 2013002296 A | 1/2013 |

OTHER PUBLICATIONS

Korean Office Action (with English language translation) dated May 9, 2016, in Korean Patent Application No. 10-2016-7003249.
Japanese Office Action (with English language translation) dated Jun. 14, 2016, in Japanese Patent Application No. 2016-516097.
Chinese Office Action (with English language translation) dated Mar. 31, 2017, in Chinese Patent Application No. 201480036863.2.
Chinese Office Action (with English language translation) dated Dec. 27, 2017, in Chinese Patent Application No. 201480036863.2.

* cited by examiner

EXHAUST-GAS TURBOCHARGER INCLUDING A CHARGE PRESSURE CONTROL LEVER HAVING BARREL-SHAPED PIN

BACKGROUND OF THE INVENTION

Field of the Invention

The invention relates to an exhaust-gas turbocharger.

Description of the Related Art

For charge pressure control, a generic exhaust-gas turbocharger may be equipped, on the compressor side, with a charge pressure control device in the form of a compressor bypass arrangement and/or, on the turbine side, with a wastegate duct which connects the turbine inlet to the turbine outlet, bypassing the turbine wheel. When the required charge pressure is attained, at least a part of the exhaust-gas flow can be conducted past the turbine or past the turbine wheel through said wastegate or bypass duct. To open and close the wastegate duct, there is provided a wastegate flap which is also referred to as a charge pressure control flap. Said charge pressure control flap is connected via a linkage to an actuator which may for example be in the form of a pneumatic control capsule or electric actuating motor. It is likewise possible, for charge pressure control, for a variable turbine geometry to be provided in which guide elements for the directed guidance of the flow in a manner dependent on mass flow rate and/or pressure are provided at the turbine inlet, the guide elements being actuable by means of an arrangement.

DE 10 2009 029 880 A1 is representative of the state of the art.

It is an object of the present invention to provide an exhaust-gas turbocharger which, while being inexpensive to produce and assemble, functions with little maintenance. In particular, the mechanical connection between the actuator and the charge pressure control device should function with little wear and should be able to be assembled in as simple a manner as possible. It is also an object of the present invention to provide a corresponding method.

The object is achieved by the features of the independent claims. The dependent claims relate to advantageous refinements of the invention.

BRIEF SUMMARY OF THE INVENTION

Within the context of the invention, an actuator is provided which moves a control rod arrangement. Said control rod arrangement is in turn rotatably connected to a lever. The charge pressure control device is actuated by means of the lever. It is provided according to the invention that a pin is arranged on the lever. The control rod arrangement has a bushing which is pushed onto the pin. Said connection between pin and bushing constitutes a rotatable connection for enabling the lever to be actuated by means of the control rod arrangement. This arrangement is very simple to produce and very simple to assemble because the bushing must merely be pushed onto the pin.

The control rod arrangement is constructed in three parts and has at least one rod, onto the end of which there is pushed a guide piece. The rod and the guide piece are preferably welded to, pressed together with or brazed to one another. The setting of the prestress of the actuator is likewise performed during this working step. The guide piece may be manufactured from a relatively inexpensive material, for example as a casting. The bushing, composed of a high-grade material, is inserted into the guide piece. The bushing is for example pressed into the guide piece. The rod is placed into a partially trough-shaped cutout in the guide piece. The partially trough-shaped cutout is in particular a semicircular recess that extends in the axial direction.

The pin is preferably of convex form at its curved surface along the longitudinal axis of the pin. In particular, it is provided here that the pin is not of excessively rounded form, that is to say is not in the shape of a sphere. For this purpose, it is defined that the inner cylindrical surface of the bushing has a diameter and that the curved surface of the pin along the longitudinal axis of the pin is of convex form with a radius. Here, the radius amounts to at least 100%, preferably at least 150%, particular preferably at least 200%, of the diameter of the inner cylindrical surface of the bushing.

The bushing and/or the pin are preferably hardened, for example by plasma nitriding or induction hardening. Owing to the convex configuration of the pin, jamming of the pin in the bushing is substantially prevented. This has the advantage that the hardened layers thus last longer, because no punctiform loading occurs between the pin and bushing.

The invention also includes a method for the assembly of an exhaust-gas turbocharger. Here, the turbine housing is firstly assembled. The charge pressure control flap is mounted in the turbine housing. Also situated on the turbine housing are the lever for actuating the charge pressure control flap, and the pin that projects from the lever. The guide piece, including the bushing, is pushed onto said pin. The control rod arrangement is fully assembled for the first time during the assembly of the turbine housing with the compressor housing. It is specifically the case that the fixed connection of the rod to the guide piece is performed, in particular by welding, during said step.

At this time, it is preferable for the rod to already be connected to the actuator, and for the actuator to already be mounted on the exhaust-gas turbocharger. The length of the rod is set during the assembly of the turbine housing on the compressor housing. For this purpose, the rod is preferably placed into a partially trough-shaped cutout in the guide piece. Here, the effective length of the rod, and the position of the charge pressure control device, can be adjusted. The rod is thereupon welded or brazed to the guide piece.

In the case of the method according to the invention, use may also be made of conventional rods which have a thread at their ends. Even rods with a thread of said type can be placed into the partially trough-shaped cutout and welded to the guide piece.

For the guide piece, use is preferably made of an easily weldable material, which in particular is free from Cr(VI).

BRIEF DESCRIPTION OF THE SEVERAL VIEWS OF THE DRAWINGS

Further details, advantages and features of the present invention become apparent from the following description of an exemplary embodiment with reference to the drawing, in which.

DETAILED DESCRIPTION OF THE INVENTION

Figure 1:
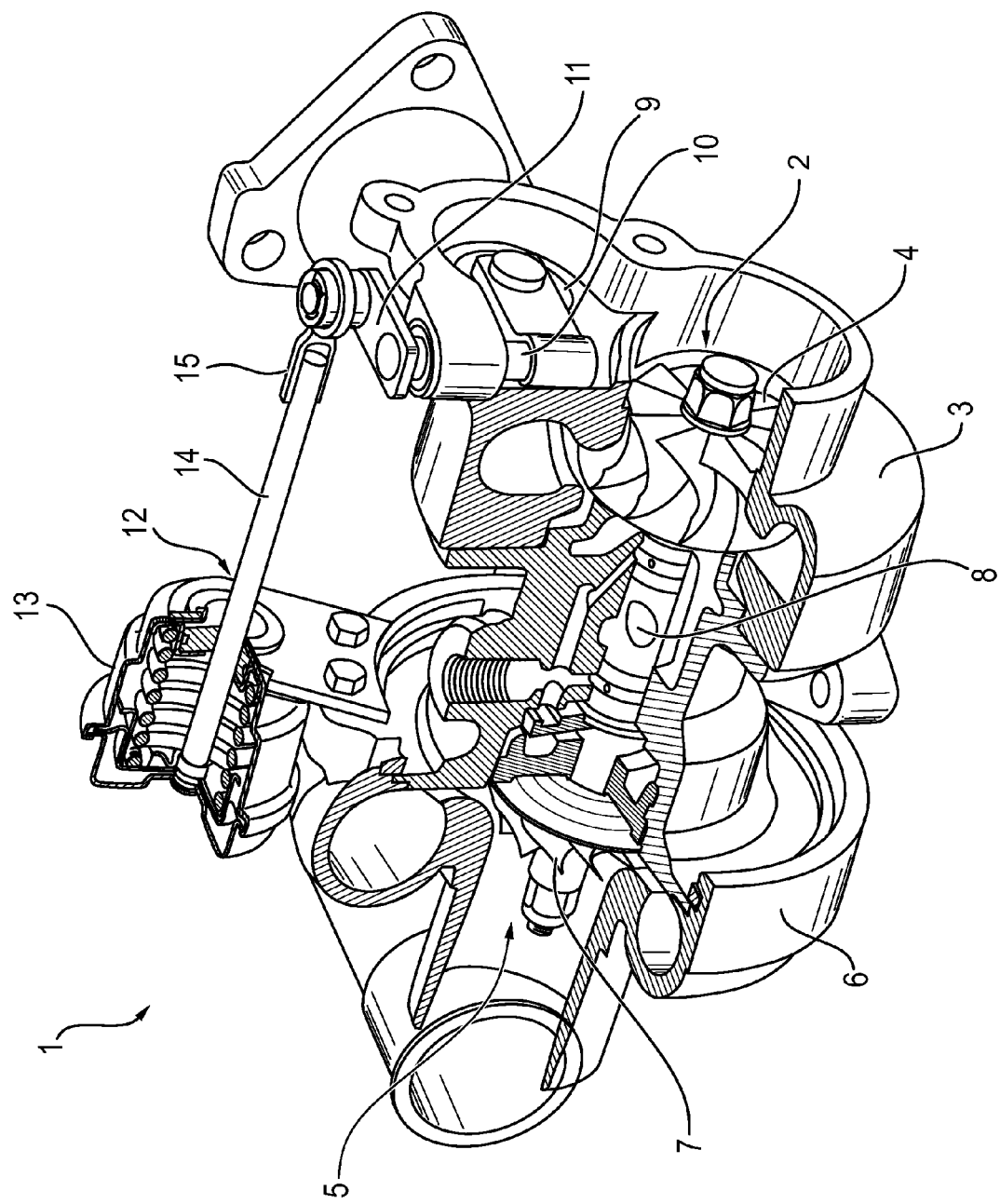
FIG. 1 shows an exhaust-gas turbocharger according to the invention as per an exemplary embodiment.

FIG. 1 shows an exhaust-gas turbocharger 1 as per the exemplary embodiment. The exhaust-gas turbocharger 1 has a turbine 2. The turbine 2 has a turbine housing 3 in which a turbine wheel 4 is arranged. Furthermore, the exhaust-gas turbocharger 1 has a compressor 5 with a compressor housing 6 and a compressor wheel 7 arranged in said compressor housing. The turbine wheel 4 is connected to the compressor wheel 7 via a shaft 8.

In the turbine housing 3 there is provided a charge pressure control device 9 which is in the form of a control flap and which opens and closes a direct connection between the turbine inlet and the turbine outlet. The charge pressure control device 9 may also be referred to as wastegate flap. The invention is however not restricted to this and may also readily be applied to the adjustment of an adjustment ring, with guide elements arranged thereon, in an exhaust-gas turbocharger (not illustrated in the drawing) with variable turbine geometry (VTG).

The charge pressure control device 9 is connected to a lever 11 via a journal 10. The lever 11 is in turn is connected via a control rod arrangement 12 to an actuator 13. The actuator 13 moves the control rod arrangement 12. Said control rod arrangement in turn moves the lever 11, such that the charge pressure control device 9 can be opened and closed by means of the actuator 13.

Figure 2:
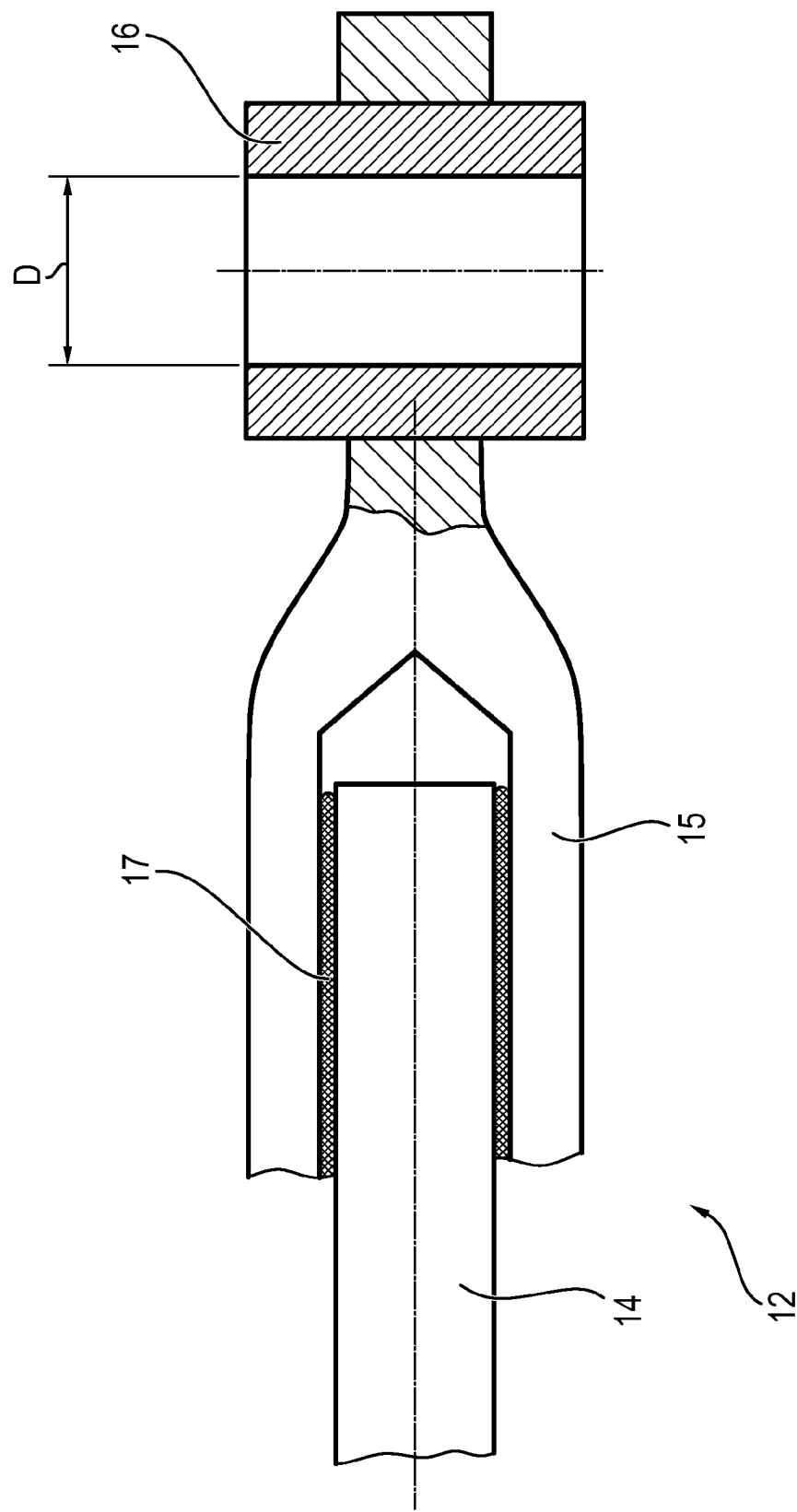
FIG. 2 shows a partially sectional view of a control rod arrangement of the exhaust-gas turbocharger according to the invention as per the exemplary embodiment.

FIG. 2 shows a detail of the control rod arrangement 12. The figure shows the end facing toward the lever 11. The control rod arrangement 12 has a rod 14, on the end of which there is arranged a guide piece 15. The rod 14 and the guide piece 15 are connected to one another by means of a welded connection 17.

The guide piece 15 is manufactured from an easily weldable casting material. A bushing 16 composed of hardened steel is pressed into the guide piece 15. The bushing 16 has a diameter D.

Figure 3:
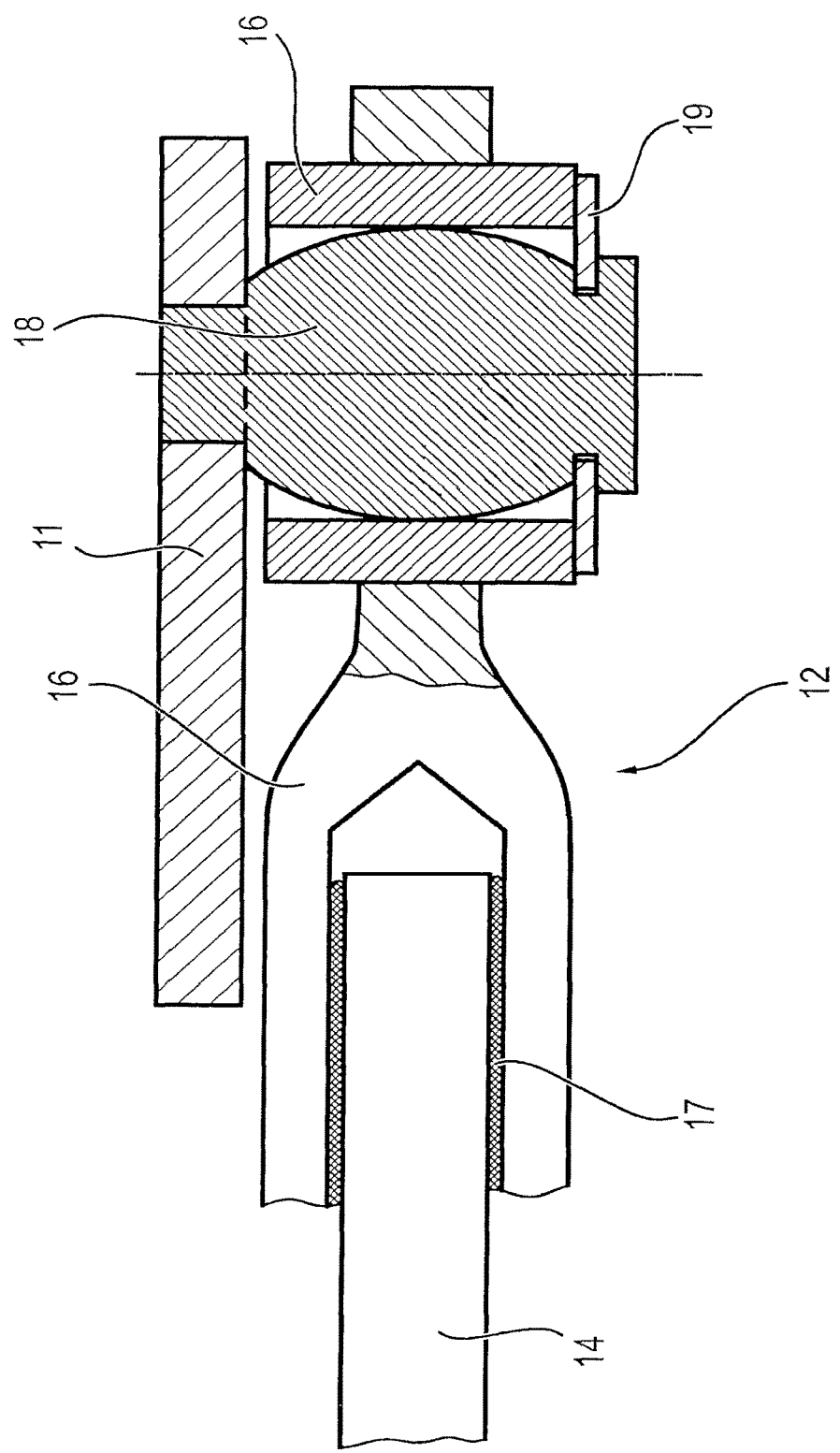
FIG. 3 shows a detail view of the exhaust-gas turbocharger according to the invention as per the exemplary embodiment.

FIG. 3 shows, in detail, the connection between the control rod arrangement 12 and the lever 11. The lever 11 has a barrel-shaped pin 18 arranged fixedly on the lever 11. The pin 18 is pushed into the bushing 16. In this way, a rotatable connection is produced between the control rod arrangement 12 and the lever 11. The pin 18 is fixed in the bushing 16 by means of a securing ring 19.

The pin 18 is formed with a radius (not shown) of the curved surface extending along the longitudinal axis of the pin. The radius is equal to or greater than the diameter d of the inner cylindrical surface of the bushing 16.

Figure 4:
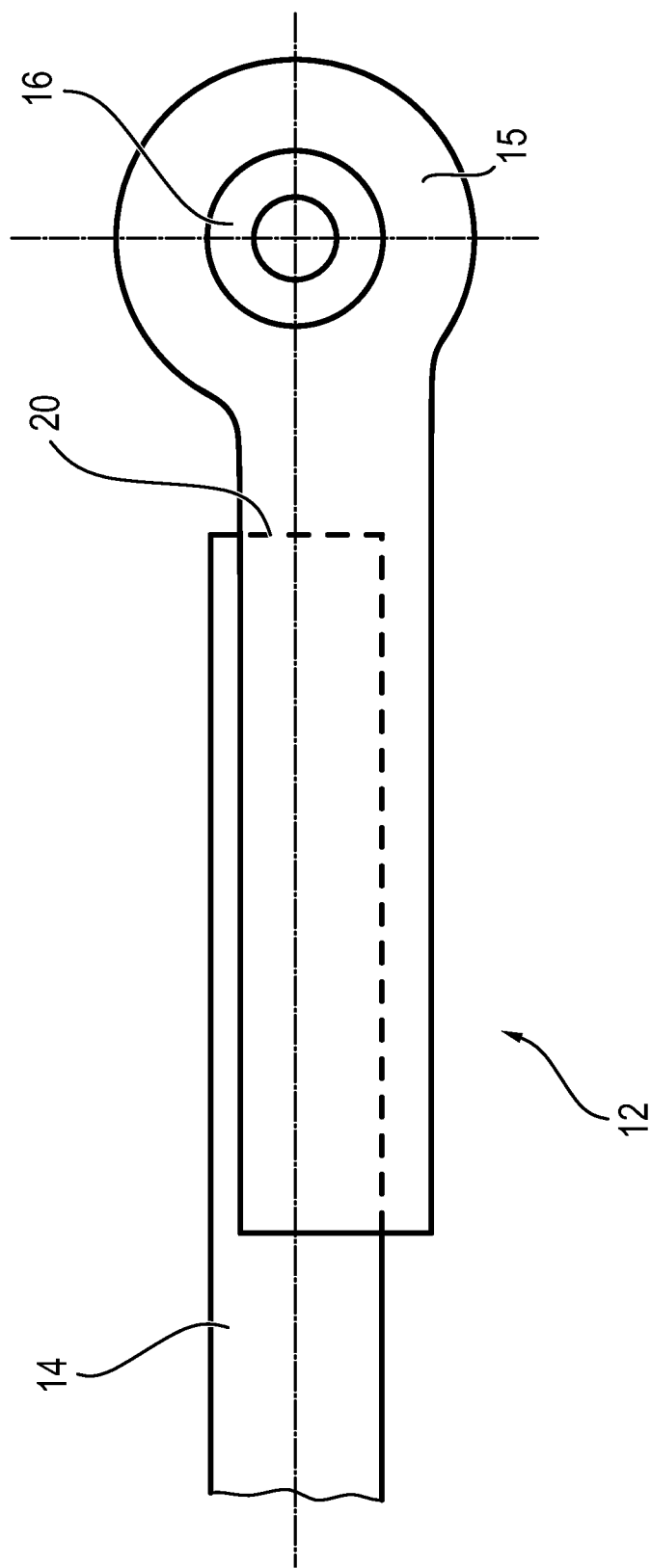
FIG. 4 shows a detail view of the control rod arrangement of the exhaust-gas turbocharger according to the invention as per the exemplary embodiment.

FIG. 4 shows a further view of the control rod arrangement 12. It can be clearly seen here that a partially trough-shaped cutout 20 is provided in the guide piece 15. The rod 14 is placed into said partially trough-shaped cutout 20 in a first assembly step during the assembly process. Owing to said cutout 20, the guide piece 15 can be formed as a very simple casting. In a second assembly step, a prestress of the actuator 13 can be set (setting of the actuator 13) by virtue of the rod 14 being moved relative to the guide piece 15 until the charge pressure control device 9 assumes a desired relative position in relation to the position adopted by the actuator 13 during the assembly process. In said position, the rod 14 is welded to, pressed together with or brazed to the guide piece 15.

Figure 5:
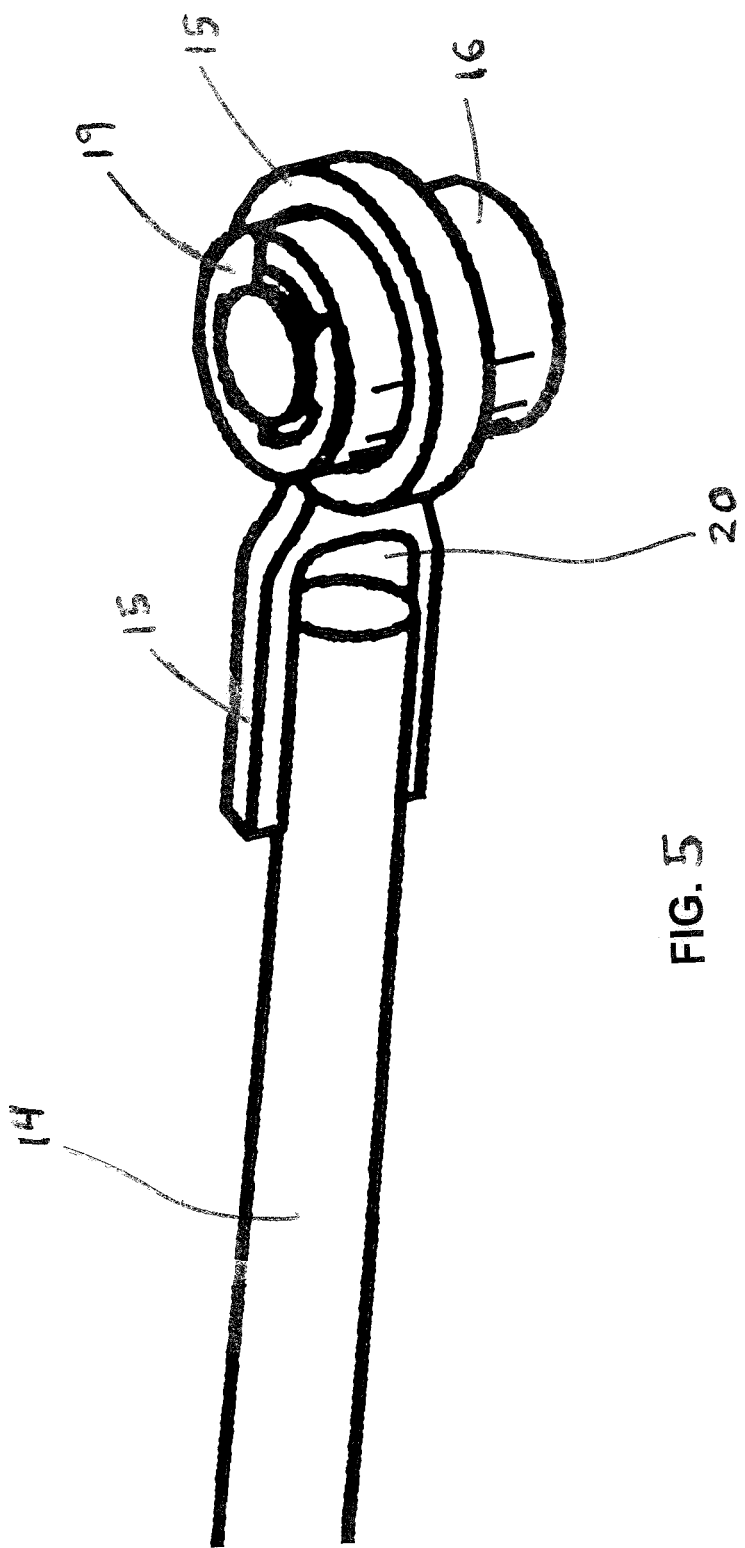
FIG. 5 is an enlargement if a portion of FIG. 1.

FIG. 5 illustrates the partially trough-shaped cutout 20 in the guide piece in the form of a semicircular recess that extends in the axial direction. FIG. 5 is an enlargement if a section from original FIG. 1.

In addition to the above written disclosure, reference is hereby explicitly made to the illustrative representation of the invention in FIGS. 1 to 4 to supplement the disclosure of the invention.

LIST OF REFERENCE SIGNS

1 Exhaust-gas turbocharger
2 Turbine
3 Turbine housing
4 Turbine wheel
5 Compressor
6 Compressor housing
7 Compressor wheel
8 Shaft
9 Control device
10 Journal
11 Lever
12 Control rod arrangement
13 Actuator
14 Rod
15 Guide piece
16 Bushing
17 Welded connection
18 Pin
19 Securing ring
20 Partially trough-shaped cutout
D Diameter

What is claimed is:

1. An exhaust-gas turbocharger (1) comprising:
    a compressor (5) with a compressor wheel (7) adapted to draw in and compress air and output compressed air having a charge pressure,
    a turbine (2) with a turbine wheel (4) connected to the compressor wheel (7) via a shaft and adapted to being driven by exhaust gas to thereby drive said compressor wheel (7),
    a charge pressure control device (9) in the form of
        on the compressor side, a compressor bypass arrangement, or
        on the turbine side, a wastegate duct which connects the turbine inlet to the turbine outlet, bypassing the turbine wheel, or a variable turbine geometry device wherein guide elements for the directed guidance of the flow are provided at the turbine inlet,
    an actuator (13) for actuating the charge pressure control device (9) to control charge pressure,
    a control rod arrangement (12) coupling the charge pressure control device (9) to the actuator (13) and that can be moved by the actuator (13), said control rod arrangement (12) comprising a control rod (14) having a first end connected to the actuator (13) and a second end connected to a guide piece (15), the guide piece (15) having a bushing (16) having a cylindrical bore, the bushing (16) being directly and fixedly connected to the guide piece (15), and
    a lever (11) connected to the charge pressure control device (9) for introducing positioning input to the charge pressure control device (9), wherein the lever (11) of the charge pressure control device (9) has a barrel-shaped pin (18) bulging in the middle of which the outer surface in the longitudinal direction is in the shape of an arc and pivotably inserted in the cylindrical bore of the bushing (16), and wherein the guide piece (15) has a semicylindrical trough-shaped recess (20) dimensioned for receiving the second end of the control rod (14), the control rod (14) being placed into the semicylindrical recess (20) and welded to, pressed together with or brazed to the guide piece (15).

2. The exhaust-gas turbocharger as claimed in claim 1, wherein the barrel-shaped pin (18) bulging in the middle of which the outer surface in the longitudinal direction is in the shape of the arc has a radius of the arc of at least 150% of the diameter of the cylindrical bore of the bushing (16) and wherein the radius of the arc of at least 150% associated with the barrel-shaped pin (18) that is arranged prior to said pivotable insertion is received in to the cylindrical bore of the bushing (16) in response to said pivotable insertion in a manner so that the radius of the arc of at least 150% associated with the barrel-shaped pin (18) fits within the diameter of the cylindrical bore of the bushing (16).

3. The exhaust-gas turbocharger as claimed in claim 1, wherein the bushing (16) is a separately manufactured component of the control rod arrangement (12).

4. The exhaust-gas turbocharger as claimed in claim 1, wherein the guide piece (15) is a casting.

5. The exhaust-gas turbocharger as claimed in claim 1, wherein the bushing (16) and/or the pin (18) is hardened.

* * * * *